United States Patent [19]

Umehara

[11] 4,087,495
[45] May 2, 1978

[54] ULTRASONIC AIR HUMIDIFYING APPARATUS

[75] Inventor: Hidetoshi Umehara, Sagamihara, Japan

[73] Assignee: Mikuni Kogyo Kabushiki Kaisha, Tokyo, Japan

[21] Appl. No.: 780,643

[22] Filed: Mar. 23, 1977

[30] Foreign Application Priority Data

Mar. 25, 1976 Japan .............................. 51-35235[U]

[51] Int. Cl.$^2$ .............................................. B01F 3/04
[52] U.S. Cl. ..................................... 261/81; 239/102; 261/1; 261/30; 261/119 R; 261/DIG. 48; 366/108
[58] Field of Search ...................... 261/1, 30, 78 A, 81, 261/82, 91, 119 R, 142, 76, DIG. 48, DIG. 65, DIG. 75, 123; 128/192, 194, DIG. 2; 239/102; 259/DIG. 41, DIG. 42, DIG. 43, DIG. 44

[56] References Cited

U.S. PATENT DOCUMENTS

| 3,097,645 | 7/1963 | Lester | 261/123 X |
|---|---|---|---|
| 3,325,976 | 6/1967 | West | 128/DIG. 2 |
| 3,387,607 | 6/1968 | Gauthier et al. | 128/DIG. 2 |
| 3,469,785 | 9/1969 | Boucher et al. | 261/DIG. 48 |
| 3,490,697 | 1/1970 | Best, Jr. | 128/DIG. 2 |
| 3,561,444 | 2/1971 | Boucher | 128/194 |
| 3,790,079 | 2/1974 | Berglund et al. | 261/DIG. 48 |
| 3,834,682 | 9/1974 | McPhee | 261/123 |
| 4,031,171 | 6/1977 | Asao et al. | 261/1 |

FOREIGN PATENT DOCUMENTS 2,201,121  4/1974  France .................. 261/DIG. 75

Primary Examiner—Tim R. Miles
Assistant Examiner—Richard L. Chiesa
Attorney, Agent, or Firm—Cushman, Darby & Cushman

[57] ABSTRACT

An ultrasonic air humidifying apparatus wherein, in order that a fine mist made by mistifying water with an ultrasonic energy may be effectively delivered through a mist conduit pipe, the mist conduit pipe positioned above the water surface of water to be mistified is covered at the lower end with a member having a plurality of openings so that an apex portion of a conical projection of water formed by swelling the water surface with the ultrasonic energy will project into the mist conduit pipe through one of said openings and an air current fed on the water surface by a blower will be led into the mist conduit pipe through said openings.

6 Claims, 5 Drawing Figures

ULTRASONIC AIR HUMIDIFYING APPARATUS

BACKGROUND OF THE INVENTION (a) Field of the Invention

This invention relates to an improvement of the ultrasonic air humidifying apparatus.

(b) Description of the Prior Art

Generally an ultrasonic air humidifying apparatus has a feature that the particles of the generated mist are very fine. However, depending on the state of the current of air delivering the mist, the already generated fine mist particles will conglomerate into large water drops and will return to a water vessel without being effectively delivered and not only the capacity of the apparatus will be reduced but also, if such means as of enlarging the cross-sectional area of a nozzle blowing out the mist is made to compensate the reduction of the capacity, large water particles will fly and disperse and the advantage of the ultrasonic air humidifying apparatus will be lost.

This state shall be explained with reference to an example of a conventional ultrasonic air humidifying apparatus whose basic arrangement is shown in FIG. 1. When an ultrasonic vibrator contained in a case C is excited by a high frequency generator not shown in the drawing, ultrasonic vibrations will be sent out toward the water surface which will be swollen to be in the form of a conical projection as shown by W and an ultrasonic energy will concentrate in an apex portion T of the conical projection W to mistify water. A wind blown out of a blower B will advance in the direction indicated by the arrow along the water surface, will flow into a conduit pipe P for delivering the mist, will rise carrying said mist and will be blown out of a nozzle N. However, in case the wind flowing along the water surface flows into the conduit pipe P for delivering the mist, due to its dynamic pressure, it will concentrate on the left side in the drawing, that is, on the side far from the blower B but, on the other hand, on the right side in the drawing, that is, on the side near to the blower B, a vacuum will be generated and air will reversely flow near the inlet of the conduit pipe and a vortex will wind as shown by the arrow in the drawing. In this part, the generated mist particles will be wound into the vortex and will collide with each other to conglomerate or will collide with the water surface to return into a water vessel V. On the side far from the blower B, as mentioned above, the wind velocity will be so high that even large water drops will be blown up and will be blown out of the nozzle N through the conduit pipe P. However, these large water drops will drop immediately by separating from the jet of the mist after having been blown out of the nozzle N. D shows that large water particles are separating and dropping. If the passage of the nozzle N is bent or is reduced in the cross-sectional area to remove large water particles, the amount of the mist will reduce by the amount lost in the above mentioned vortex. If the amount of the mist is not reduced, large particles will be contained.

SUMMARY OF THE INVENTION

The primary object of the present invention is to provide an ultrasonic air humidifying apparatus arranged so as to be able to efficiently discharge a high quality mist by preventing the generation of an air vortex and giving a uniform flow velocity to the cross-section of a conduit pipe for delivering the mist.

According to the present invention, this object is attained by an arrangement wherein a mist conduit pipe positioned above the water surface is covered at the lower end with a plate having a plurality of openings, a top portion of a conical projection formed by swelling the water surface with an ultrasonic energy is projected into the mist conduit pipe through one of the above mentioned openings and air currents fed by a blower into a space formed on the water surface are led into the mist conduit pipe through the above mentioned openings. The above-mentioned plate may be a part of a chassis board for defining a water vessel.

According to the present invention, the velocity distribution of the flow of air will become uniform in any position on the cross-section of the mist conduit pipe without generating a vortex in the mist generating section, therefore, the generated fine mist particles will be effectively sent out without loss and, even in case the form of the nozzle is so selected as to remove large water particles, an efficient humidifying capacity will be able to be given for a fixed high frequency energy put into the ultrasonic vibrator.

This and other objects of the present invention will become more apparent in the course of the following detailed description and appended claims.

DETAILED DESCRIPTION OF THE PREFERRED EMBODIMENT

Figure 1:
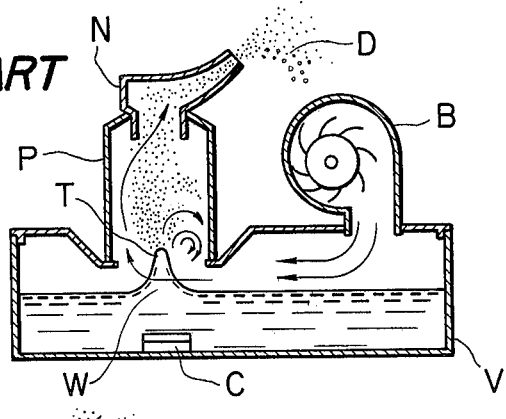
FIG. 1 is a schematic vertical sectional view of an example of a conventional ultrasonic air humidifying apparatus.
Figure 2:
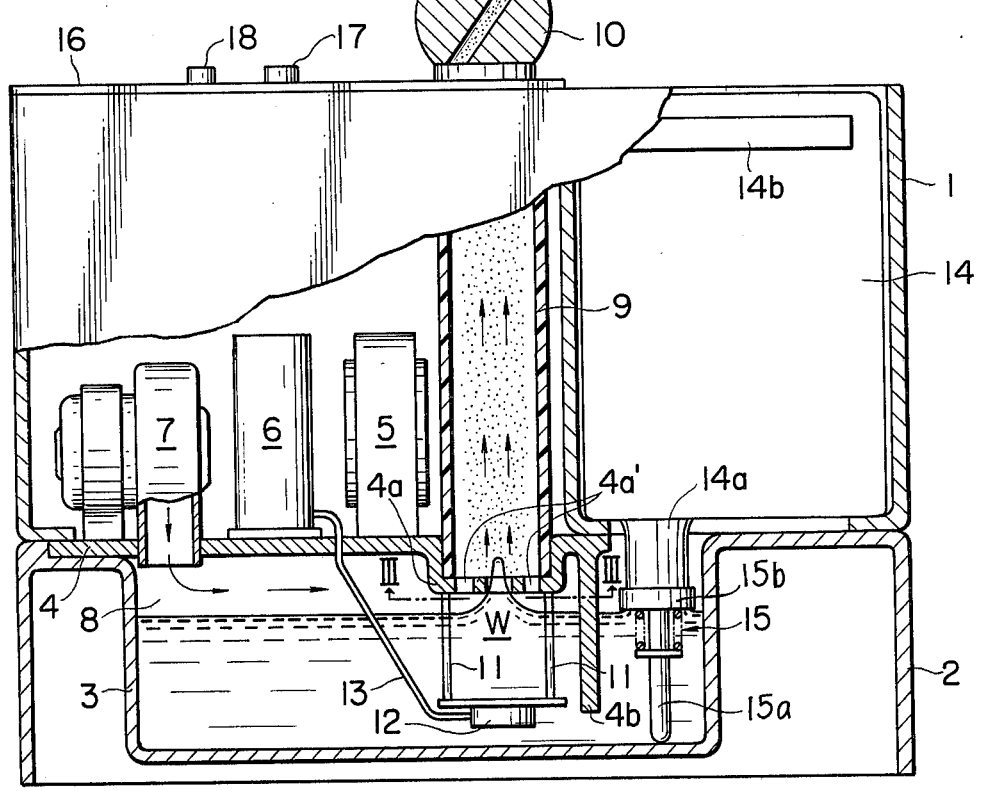
FIG. 2 is a front elevational view, partly in section of an embodiment of the ultrasonic air humidifying apparatus according to the present invention.
Figure 3:
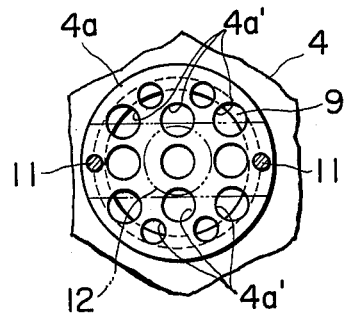
FIG. 3 is a somewhat enlarged view on line III — III in FIG. 2.

As shown in FIG. 2, the ultrasonic air humidifying apparatus according to the present invention comprises an upper cabinet 1 rectangular in its entirety and a lower cabinet 2 arranged below this upper cabinet 1 and rectangular in its entirety. The upper cabinet 1 is substantially opened in the bottom portion, the lower cabinet 2 has a water vessel 3 formed integrally in the central portion and the upper cabinet 1 and lower cabinet 2 are separably connected with each other by using bolts and nuts or the like, not illustrated, with a chassis board 4 interposed between them. A circular cavity 4a of a proper depth is formed on the chassis board 4. As clearly shown in FIG. 3, a plurality of openings 4a' are made in the bottom wall of the cavity 4a. Further, a power transformer 5, high frequency generator 6 and motor blower 7 are installed on the chassis board 4. The primary terminals of the transformer 5 are connected with a regular receptacle not illustrated and its secondary terminals are connected with the high frequency generator 6. This power transformer 5 is not always required depending on the kind of the high frequency generator. The motor blower 7 is driven directly from a commercial current source so as to be able to feed air into a space 8 defined by the peripheral wall of the water vessel 3, the water surface of water contained in the water vessel 3, the chassis board 4 and a partition wall 4b suspended into the water vessel 3 from the chassis board 4. A mist conduit pipe 9 made of plastics, projecting in the upper portion above the top surface of the upper cabinet 1 through the upper cabinet 1 and tightly fitted at the lower end within the cavity 4a is further installed on the chassis board 4. A spherical nozzle body 10 mounted so as to be rotatable in all directions is provided at the upper end of the conduit pipe 9. A pair of stays 11 submerged in the water are secured to the bottom wall of the cavity 4a of the chassis board 4 and have an ultrasonic vibrator assembly 12 fixed to the lower ends. A coaxial cable 13 to feed a high frequency energy to an ultrasonic vibrator is connected between the high frequency generator 6 and ultrasonic vibrator assembly 12. It is important here that any one of the plurality of openings 4a' provided in the bottom wall of the cavity 4a must be concentric with the ultrasonic vibrator 12 and must have a diameter large enough to prevent the periphery of the conical projection of water caused by ultrasonic vibrations from contacting the edge of of the opening. The other openings than the above mentioned one are to uniformly lead air into the mist conduit pipe 9 and may be therefore of any size. As shown in FIG. 3, according to a preferred embodiment of the ultrasonic air humidifying apparatus of the present invention provided with one ultrasonic vibrator, the opening for passing the conical projection W of water is aligned with the center axis of the conduit pipe 9 and the other openings are arranged symmetrically with each other with respect to this center axis. A water supply tank 14 is removably fitted within the upper cabinet 1 and is provided with an outlet pipe 14a projecting into the water vessel 3 when used and a handle 14b useful in the case of taking the tank 14 out of the upper cabinet 1. A valve assembly 15 for stopping the flow of water from the tank 14 while the tank filled with water is inserted within the upper cabinet 1 is installed on the lower end portion of the outlet pipe 14a. When the tank 14 has been fitted in a predetermined position in the upper cabinet 1 as shown in FIG. 2, a rod 15a of the valve assembly 15 is pushed up by the bottom surface of the water vessel 3 to open a valve not shown, therefore, the water in the tank 14 flows out into the water vessel 3 so as to keep the water level within the water vessel 3 in the standard level determined by the lower surface of a cap 15b of the valve assembly 15. The upper cabinet 1 is covered in the top portion except the portion for taking out the water supply tank 14 with a top plate 16 which is provided with a power switch 17 for keeping the power transformer 5 or high frequency generator 6 operative or inoperative and a lamp 18 kept lighted while the power switch 17 is closed to keep the power transformer 5 or high frequency generator 6 operative.

The operation of the above described apparatus shall be explained in the following.

If the power switch 17 is operated while the water level in the water vessel 3 is on the standard level as shown in FIG. 2, the power transformer 5, high frequency generator 6 and motor blower 7 will be in an operating state, a high frequency electric power will be fed to the ultrasonic vibrator 12 through the cable 13 from the generator 6 and an ultrasonic energy will be fed into the water. The ultrasonic energy will propagate upward and will swell the surface of water so as to be in the form of a conical projection. The ultrasonic energy will concentrate at the apex of the conical projection W formed on the water surface and a mist or water droplets of a diameter less than 5 microns will be produced there. In such case, the top portion of the conical projection W of water formed on the water surface will project into the conduit pipe 9 through the opening 4a' formed in the bottom wall of the cavity 4a and, as a result, the mist or water droplets will be produced within the conduit pipe 9. The air current fed out of the motor blower 7 into the space 8 will advance as indicated by the arrow into the conduit pipe 9 through the plurality of openings 4a', will rise through the conduit pipe 9 together with the mist produced as described above and will blow out of the nozzle 10. In such case, as the inlet ports 4a' for air into the conduit pipe 9 are formed at the lower end of the conduit pipe 9 and the total area of the openings 4a' is far smaller than the cross-sectional area of the conduit pipe, the dynamic pressure of the wind blown into the space 8 from the blower 7 will little influence within the conduit pipe 9 and, as a result, the air current in the conduit pipe 9 will be generated rather by a static pressure. Therefore, the velocity distribution of the air current flowing upward through the conduit pipe 9 will become uniform over the entire cross-sectional area of the conduit pipe and no vortex will be produced there.

Figure 4:
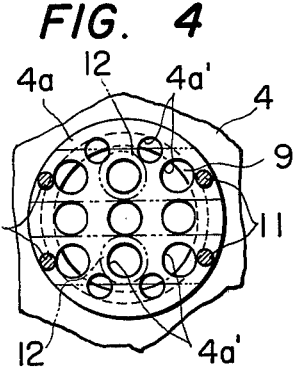
FIG. 4 is the same view as in FIG. 3 in case two ultrasonic vibrators are used.

FIG. 4 shows an embodiment in which two such ultrasonic vibrator assemblies 12 as illustrated in FIG. 2 are provided. In such case, two pairs of stays 11 will be provided and two of the plurality of openings formed in the bottom wall of the cavity 4a will serve to project two conical projections W formed on the water surface into the conduit pipe 9. That is to say, this embodiment suggests that a plurality of ultrasonic vibrator assemblies can be used to increase the capacity of the humidifying apparatus.

Figure 5:
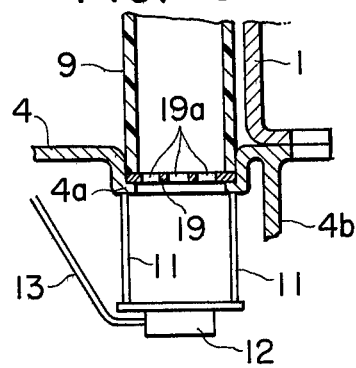
FIG. 5 is a sectional view of an essential portion of another embodiment of the ultrasonic air humidifying apparatus according to the present invention.

FIG. 5 shows further another embodiment of the ultrasonic air humidifying apparatus according to the present invention. According to this embodiment, the cavity 4a formed on the chassis board 4 is opened in the bottom portion to serve to fit the conduit pipe 9 at the lower end to the chassis board 4. The conduit pipe 9 is covered at the lower end with a disk 19 having a plurality of openings 19a and inserted between said lower end and the bent edge of the cavity 4a. The size and arrangement of the plurality of openings 19a are selected the same as of the plurality of openings 4a' formed in the bottom wall of the cavity 4a. Further, in the illustrated embodiment, the chassis board 4 is formed separately from the upper and lower cabinets 1 and 2 but may be formed integrally with the upper cabinet or lower cabinet respectively as the bottom wall of the upper cabinet 1 or the top wall of the lower cabinet 2.

I claim:

1. An ultrasonic air humidifying apparatus comprising an upper cabinet, a lower cabinet separably connected with said upper cabinet, a water vessel formed in said lower cabinet, a chassis board interposed between said upper cabinet and said lower cabinet and having a cavity projecting into said water vessel, a high frequency generator and motor blower installed on said chassis board, a conduit pipe having a lower end fitted into said cavity above the surface of water contained in said water vessel and having an upper portion extending therefrom upward through said upper cabinet, a plate member covering said conduit pipe at the lower end and having a plurality of openings, an ultrasonic vibrator assembly set in the water contained in said water vessel vertically below said plate member and connected with said high frequency generator, at least one of said plurality of openings in said plate member being located concentrically with said vibrator assembly and having a size and distance from said water surface such that a conical projection formed by ultrasonic energy on the surface of the water contained in said water vessel can project through said at least one opening into said conduit pipe, whereby the other of said plurality of openings which are not concentrically located with respect to said vibrator assembly will admit the air blown over the surface of the water in said water vessel from said motor blower.

2. An ultrasonic air humidifying apparatus according to claim 1 wherein said plate member is formed as a bottom wall portion of said cavity.

3. An ultrasonic air humidifying apparatus according to claim 1 wherein said plate member is removably inserted between the lower end of said conduit pipe and the lower edge of said cavity.

4. An ultrasonic air humidifying apparatus according to claim 1 wherein said plurality of openings are arranged symmetrically with each other with respect to the center axis of said conduit pipe.

5. An ultrasonic air humidifying apparatus according to claim 1 wherein said chassis board forms a portion of said upper cabinet.

6. An ultrasonic air humidifying apparatus according to claim 1 wherein said chassis board forms a portion of said lower cabinet.

* * * * *